(12) United States Patent
Winstead et al.

(10) Patent No.: US 7,629,922 B2
(45) Date of Patent: Dec. 8, 2009

(54) METHOD AND SYSTEM FOR OBTAINING IN-PHASE AND QUADRATURE COMPONENTS OF A SIGNAL

(75) Inventors: Benjamin J. Winstead, Roseville, MN (US); Jason I. Formo, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 242 days.

(21) Appl. No.: 11/863,487

(22) Filed: Sep. 28, 2007

(65) Prior Publication Data

US 2009/0085798 A1    Apr. 2, 2009

(51) Int. Cl.
*G01S 13/00* (2006.01)

(52) U.S. Cl. .......................... 342/194; 342/70; 342/175

(58) Field of Classification Search ............. 342/70–72, 342/94–97, 175, 194
See application file for complete search history.

(56) References Cited

U.S. PATENT DOCUMENTS

| | | | | |
|---|---|---|---|---|
| 5,589,833 A * | 12/1996 | Randall et al. | .............. | 342/195 |
| 5,619,998 A * | 4/1997 | Abdel-Malek et al. | ...... | 600/437 |
| 5,864,313 A * | 1/1999 | Speck et al. | .................. | 342/98 |
| 5,969,667 A * | 10/1999 | Farmer et al. | ................ | 342/165 |
| 6,125,155 A * | 9/2000 | Lesthievent et al. | ......... | 375/350 |
| 6,674,397 B2 * | 1/2004 | Hager et al. | ................ | 342/159 |
| 6,727,842 B1 * | 4/2004 | Schleder et al. | ............... | 342/30 |
| 6,856,279 B2 * | 2/2005 | Hager et al. | ................ | 342/147 |
| 6,989,782 B2 * | 1/2006 | Walker et al. | ............... | 342/134 |

* cited by examiner

*Primary Examiner*—Thomas H Tarcza
*Assistant Examiner*—Peter M Bythrow
(74) *Attorney, Agent, or Firm*—Fogg & Powers LLC (57) ABSTRACT

A method of obtaining in-phase and quadrature phase components for a narrowband signal is provided. The method includes digitally sampling a narrowband signal at a digital sampling rate to obtain a number of data points. The method subtracts a first portion of the data points corresponding to a first half of one period of the signal from a second portion of the data points corresponding to a second half of the one period of the signal to obtain a number of output data points which is less than the number of data points obtained from sampling the narrowband signal.

20 Claims, 8 Drawing Sheets

METHOD AND SYSTEM FOR OBTAINING IN-PHASE AND QUADRATURE COMPONENTS OF A SIGNAL

BACKGROUND

Many radio systems operate by receiving a signal pulse and processing the signal pulse. One common example of a system which receives and processes a pulse radio signal is a radar system. Many radar systems operate by receiving and processing a pulsed signal that has reflected off of a remote object. These radar systems or other radio systems which process a pulse radio signal are used in aircraft navigation, air traffic control, target tracking, missile seeking, radar altimeters, and many others.

Many of these pulse signal processing systems require extensive processing of a received radio signal to properly analyze and ensure accuracy of data obtained from the signal. For example, data provided by radar navigation systems is critical to properly guide air based vehicles as there are no defined roads for the vehicles to follow. These radar systems act as the "eyes" of the vehicle and are often the only mechanism for navigation of the vehicle. The radar systems obtain a range measurement of the distance between the radar and the remote object by reflecting a pulse signal off of those objects and processing the reflected pulse signal. Accurate and efficient processing of the pulse signal is imperative for proper range measurement. The pulse processing, however, is a complex task and the calculations involved can take considerable time and require substantial processing power. Along with accuracy, speed and efficiency are also important to ensure that the controller of the aircraft has current information.

To further increase the reliability and accuracy of radar systems, many modern systems process the radar signal digitally. Digital processing increases the precision of the system, but it also drastically increases the amount of processing power required and often the processing time required. This is because many conventional systems individually process every data point that is sampled. As is often the case in these systems, the amount of computation required to analyze a signal is the limiting factor for the speed at which samples can be processed, and is thus a limiting factor in the precision of the system. The substantial level of computation required by digital processing also increases the power consumption of the system, which requires more and larger power supplies, thus increasing the overall weight and size of the system.

Radar navigation is only one example of a system which receives and processes a pulse radio signal, however, many of the pulse radio systems have the same difficulties associated with pulse radio signal processing. For the reasons stated above, and for other reasons stated below which will become apparent to those skilled in the art upon reading and understanding the present specification, there is a need in the art for a method of reducing the processing of a system that receives a pulse radio signal.

SUMMARY

A method and system for obtaining in-phase and quadrature phase components for a narrowband signal are provided. The method includes digitally sampling a narrowband signal at a digital sampling rate to obtain a number of data points. The method subtracts a first portion of the data points corresponding to a first half of one period of the signal from a second portion of the data points corresponding to a second half of the one period of the signal to obtain a number of output data points which is less than the number of data points obtained from sampling the narrowband signal.

BRIEF DESCRIPTION OF THE DRAWINGS

The present invention can be more easily understood, and further advantages and uses thereof are more readily apparent, when considered in view of the detailed description and the following figures in which.

DETAILED DESCRIPTION

In the following detailed description, reference is made to the accompanying drawings that form a part hereof, and in which is shown by way of illustration specific embodiments in which the method and system may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide for a method and system for reducing the computation required to determine a location with a radar system. Some embodiments reduce the computation required by representing a received radar pulse with two points, an in-phase and quadrature phase component of the signal. The in-phase and quadrature phase components are determined by first compressing the received digitally sampled data into four data points which corresponds to one period of the signal. The four points are then further compressed to two points by subtracting the later two points (which are 180 degrees from each of the first two points respectively) from the first two points.

Figure 1:
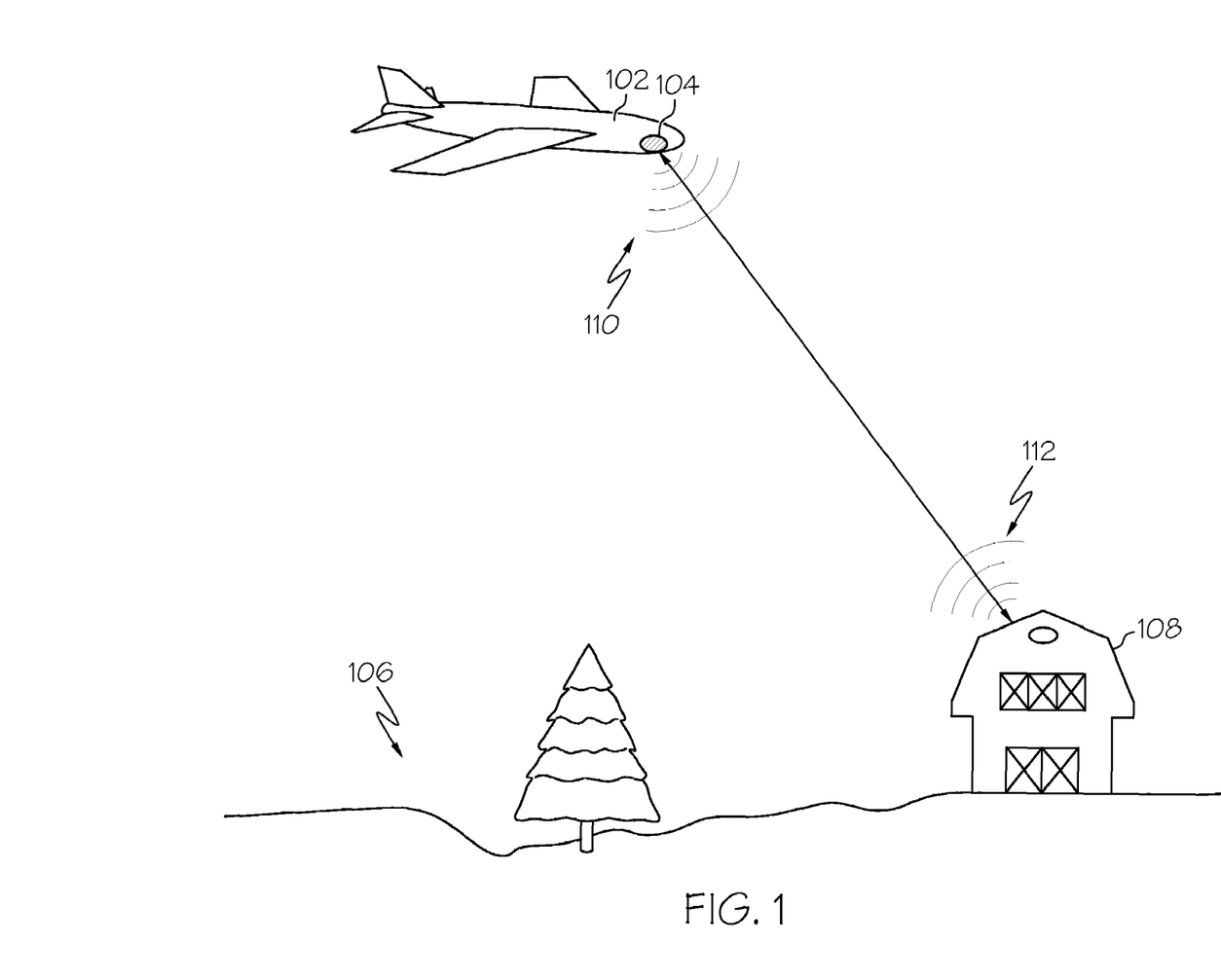
FIG. 1 illustrates one embodiment of a vehicle having a radar system for use in navigation.

FIG. 1 illustrates one embodiment of a vehicle 102 having a radar system which is used for navigation purposes. Although, vehicle 102 is shown as an aircraft, such as a jet or airplane, other aircrafts may be utilized such as helicopters, unmanned aerial vehicles, guided weapons, and the like. Vehicle 102 includes a radar system 104 which transmits pulses toward the ground 106 and receives echos of the pulses. The pulses transmitted by radar system 104 are absorbed by some areas on the ground and are reflected by other areas. As shown in FIG. 1, the transmit pulse from radar system 104 is reflected off of structure 108 and the return (reflected) pulse 112 is received by radar system 104. To aid in navigation of vehicle 102, radar system 104 determines distances to areas or structures from which return pulses are received. To determine a distance to structure 108, radar system 104 measures the time between the transmission of a radar pulse 110 and reception of return pulse 112. The time measured is used along with the known propagation speed of the pulse, in a calculation which can approximate the distance that the pulse traveled to and from structure 108.

Figure 2:
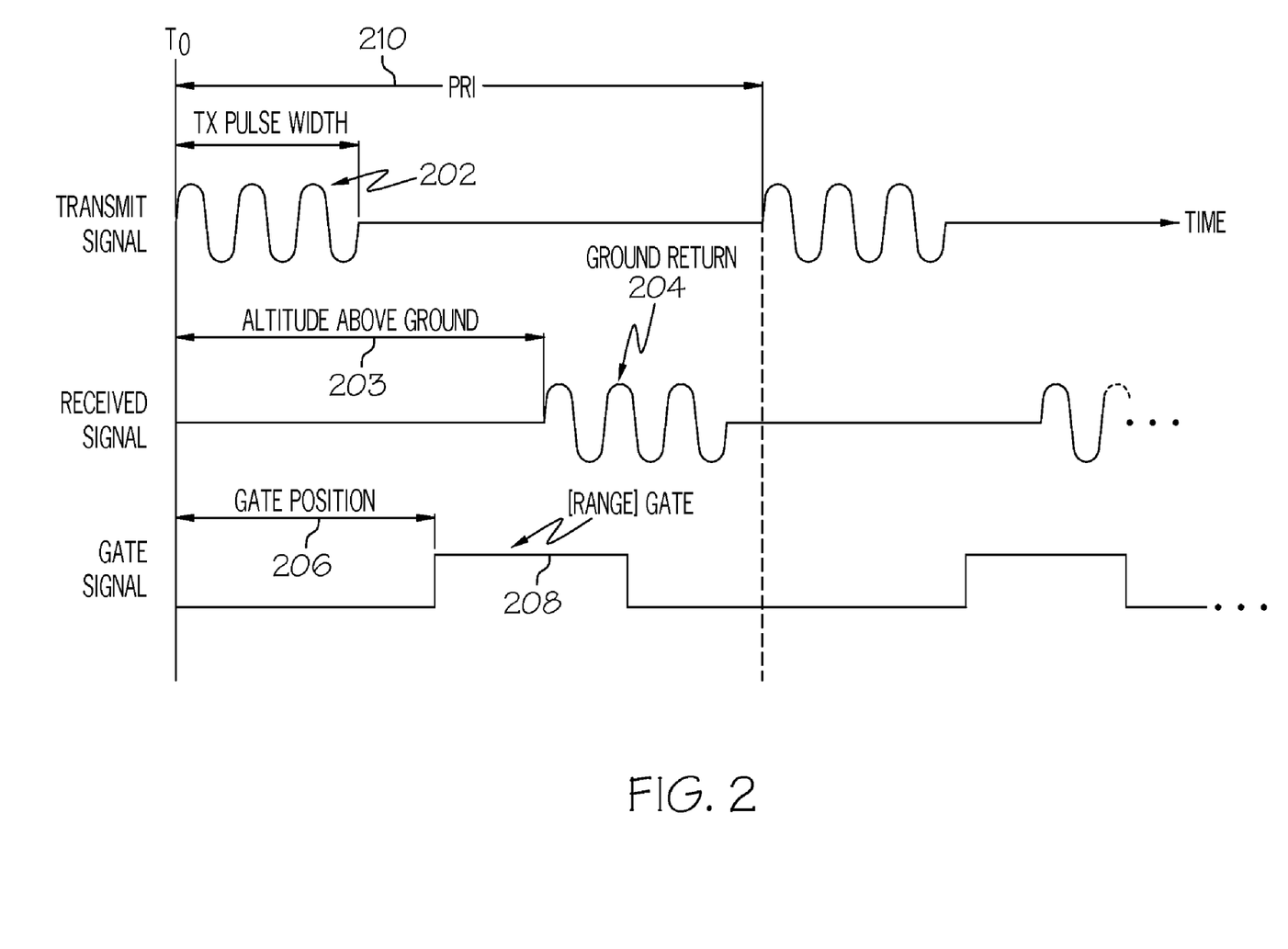
FIG. 2 is a timing diagram for one embodiment of the timing of a gated pulse transmission radar system.

FIG. 2 is a timing diagram illustrating one embodiment of transmitted and reflected radar signals from radar system 104. A narrowband pulse 202 is first transmitted by radar system 104 at time $T_0$. Then, a period of time 203 elapses while the radar pulse propagates toward the ground, reflects off of structure 108, and propagates back to vehicle 102. This period of time 203 is relative to the altitude that vehicle 102 is above ground 106. Once return pulse 204 has propagated back to vehicle 102, radar system 104 receives return pulse 204. Radar system 104 then analyzes return pulse 204 by digitally sampling return pulse 204 and processing the digital samples with a band pass filter.

In this embodiment, a gate is used to aid in the digital sampling of return pulse 204. The gate focuses the timing of the digital sampling around return pulse 204, such that radar system 104 samples return pulse 204, but avoids capturing excess noise before and after return pulse 204 arrives at radar system 104. Thus, the gate controls the reception of signals such that signals are received when the gate is open and the device is blocked from receiving signals when the gate is closed. The use of a gate at the entrance to the filter increases the efficiency of the system, because continuous processing is not required. The use of a gate is possible, because the band pass filter is only concerned with a pulse return signal, not a continuous signal, therefore, the only valid data to be captured occurs during a short period of time when return pulse 204 arrives at radar system 104. Any time other than the time period around return pulse 204 is noise and contains no valid data. In one embodiment, during the time when the gate is closed, the data is summed into one complex (I and Q) data point which is fed to the band pass filter. Here, the new sample rate is decimated to 1/PRI (pulse repetition interval 210, explained below). In an alternative embodiment, zeros are fed to the band pass filter to approximate the reception of no valid data when the gate is closed. Gating the received signal reduces processing in the band pass filter, because the filter does not need to fully process the continuous noise looking for data between received return pulses 204.

To capture return pulse 204, the gate opens for a period of time and then closes. The gate timing is controlled by the system based on the predicted or measured time of the arrival of return pulse 204 at aircraft 102. In one embodiment, the gate is opened to capture the rising edge of return pulse 204, and is held open to collect the desired amount of samples from return pulse 204. The timing of the gate opening is based on the timing of transmit pulse 202. Known as the gate position 206, the gate is opened after an amount of time passes between the start of transmission of transmit pulse 202. Once the gate is open, the gate stays open to collect samples for the duration of a gate window 208. Gate window 208 is typically based on the width of return pulse 204, which, in turn, is based on the length of transmit pulse 202. The duration of gate window 208 is selected based on the amount of samples of return pulse 204 that are desired. At the end of gate window 208, the gate is closed and no more samples are received through the gate.

Transmit pulse 202 and return pulse 204 are repeated over time to obtain locations for vehicle 102 as vehicle 102 travels. In one embodiment, transmit pulse 202 is transmitted periodically. In other embodiments, transmit pulse 202 is transmitted and collected at random times to reduce the ability of others to determine a location for vehicle 102 from the transmit pulses. The amount of time between transmit pulses transmitted by radar system 104 is known as the pulse repetition interval 210. For example, in one embodiment, PRI 210 is 10 microseconds long.

While the gate is open, samples are taken for processing by the band pass filter, and some samples captured from return pulse 204 are also used for tracking of the gate position 206. When the distance between vehicle 102 and structure 108 changes as vehicle 102 moves closer or farther from structure 108, the amount of time taken by transmit pulse to propagate from vehicle 102 to structure 108 and back also changes. The gate position 206 is adjusted to accommodate for the amount of propagation time of the transmit pulse 202 and return pulse 204. For example, when vehicle 102 moves closer to structure 108 (inbound movement) the propagation time for the transmit pulse decreases relative to the previous transmit pulse. Likewise, when vehicle 102 moves away from structure 108 (outbound movement), the propagation time for transmit pulse increases relative to the previous transmit pulse. Any change in the propagation time changes the time of the reception of return pulse 204 at vehicle 102 relative to the time of transmission of transmit pulse 202. Thus for an inbound movement, the gate window moves to accommodate the changes in the reception time of return pulse 204. To track the gate for an inbound movement, time is subtracted from the space between the transmit pulse and the gate opening. Likewise to track the gate for outbound movement, time is added to the space between gate opening.

Return pulse 204 is digitally sampled at a multiple of the intermediate frequency (IF) center frequency of the signal. In one embodiment, the signal is sampled at a minimum of 2 times the bandwidth of the signal (Nyquist rate) to avoid aliasing. In one embodiment, the sampling frequency satisfies the equation fIF=(2*n−1)*Fs/4, where fIF is the IF center frequency of the signal, Fs is the sample frequency of the analog to digital converter (ADC) and n is any positive integer greater than zero. This equation satisfies the requirements of one embodiment where each consecutive sample that is gated represents a sample whose phase is 90 degrees from the previous sample. When the equation computes a fIF that is higher than Fs, a form of aliasing results, however, the aliasing is not detrimental to the systems when the bandwidth meets the Nyquist criteria listed above. In this embodiment, return pulse 204 is sampled at 4 times the center frequency of the pulse. The center frequency of the pulse is 25 Mhz (IF), and the sample rate is 100 Mhz. Sampling at 4-times the center frequency results in four samples per period of the waveform. In one embodiment, the width of gate window 208 results in four samples of data taken of return pulse 204. In this embodiment, the four samples of data represent one full period of return pulse 204. The four samples (data points) captured at the gate are used by radar system 104 for further processing as will be described in greater detail below.

Figure 3:
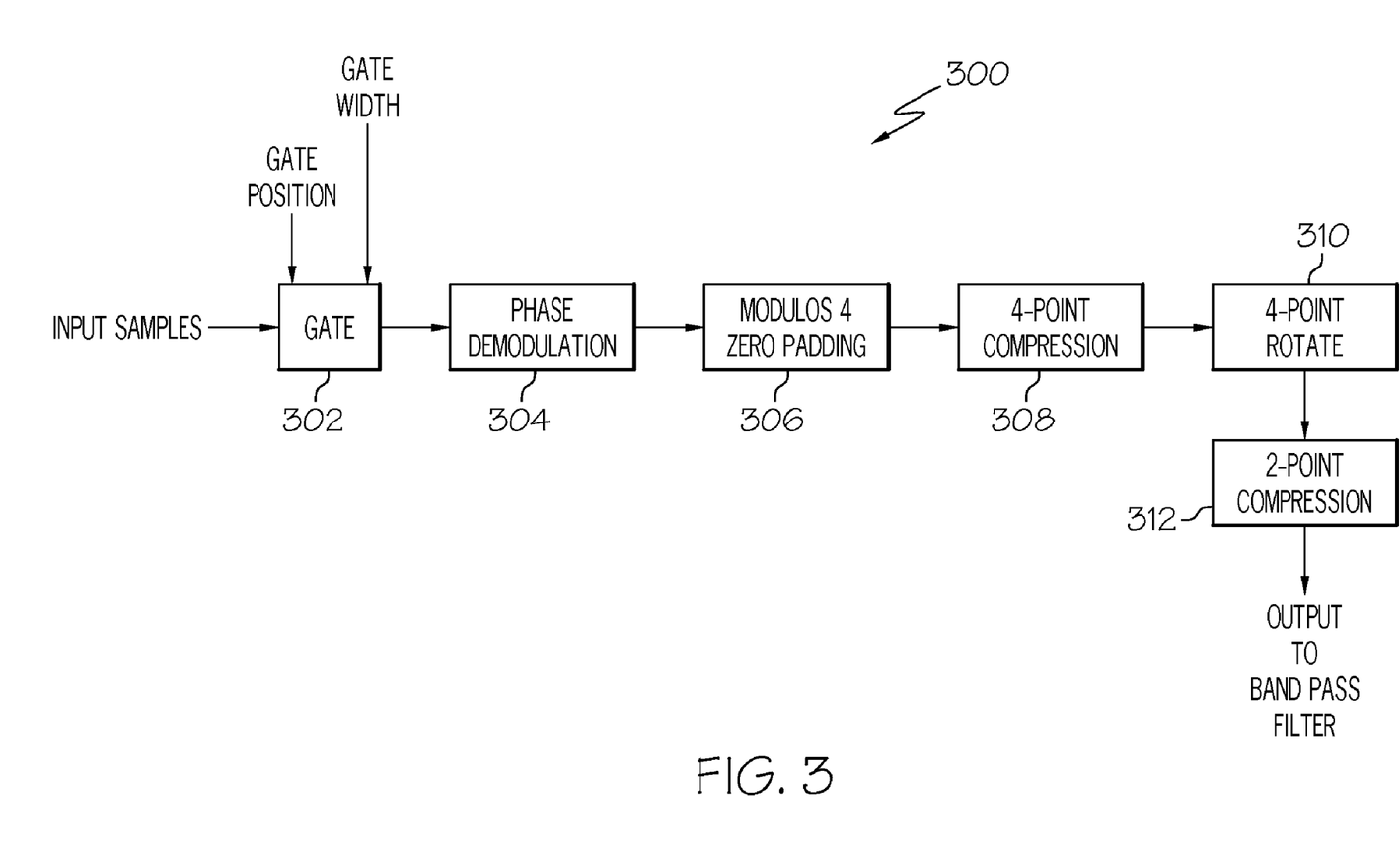
FIG. 3 is a functional block diagram of one embodiment of a system for processing return pulses from a radar.

Referring now to FIG. 3, a functional block diagram of one embodiment of a system 300 for reducing the processing time for narrow band filtering of digital samples is illustrated. System 300 captures return pulses through a gate 302 which is controllable by width and timing as described above. Gate 302 opens to capture a return pulse and digitally samples the return pulse. As known to those skilled in the art, prior to arriving at gate 302, the analog waveform received is processed by an analog filter and mixed down to the intermediate frequency (IF) of 25 Mhz. The analog filtering provides the appropriate bandwidth signal for the system. The bandwidth is wide enough to pass the narrowest pulse width the system is capable of processing and narrow enough to reduce the out-of-band noise (aliasing) and meet the Nyquist requirement of a sample frequency greater than 2 times the bandwidth passed by the analog filtering. The signal is then processed by an analog to digital converter (ADC) and is sent to the gate.

In this embodiment, the digital samples are represented by 12-bit twos compliment numbers. Once collected, the samples are sent to a phase demodulator 304 where the demodulator removes any phase coding such as biphase or polyphase coding that was used to modulate the transmit pulse. Biphase demodulation is typically performed by inverting the sign of specific samples based on their position in the code. In other embodiments, other methods of demodulation are used as known to those skilled in the art. The output of demodulator 304 is also 12-bit twos compliment numbers. From demodulator 304 the samples are zero padded if necessary at block 306 to prepare the samples for 4-point compression by bringing the total number of samples up to a number which is a multiple of four. Then, the samples are put through 4-point compression at block 308 to reduce the amount of data and increase the signal to noise ratio. The output of the four point compression scheme is a four N-bit twos compliment numbers. The modulos 4 zero padding and four point compression process are described in greater detail with respect to FIG. 4.

Once the data has been compressed to four data points, the data points are rotated at block 310 by a 4-point rotation scheme. The 4-point rotation scheme shifts the position of the data points as needed to align the phase of the current data points with data points which were previously received by radar system 104. The 4-point rotation scheme is described in further detail hereafter with respect to FIG. 6. The four N-bit twos compliment numbers are then subjected to 2-point compression at block 312 to further reduce the size of the data. 2-point compression is described in greater detail with respect to FIG. 7. The output of the 2-point compression is two N+1 bit twos compliment numbers. These two numbers are then sent to the band pass filter for use in determining a location of vehicle 102. In one embodiment, each of functional blocks 302, 304, 306, 308, 310, 312 is performed by a field programmable gate array (FPGA).

Although as shown and described with reference to FIG. 3, 4-point compression 308, 4-point rotate 310, and 2-point compression 312 are shown in a particular order, it should be understood that due to the mathematical nature of the 4-point compression, the 4-point rotate, and the 2-point compression, the order of the steps can vary from that shown in FIG. 3. For example, in other embodiments, 4-point rotate is performed on each 4 consecutive samples of the sampled data. The rotated data is then 4-point compressed and then 2-point compressed. Further, in yet another embodiment, 4-point compression and 2-point compression are calculated as one step.

Figure 4:
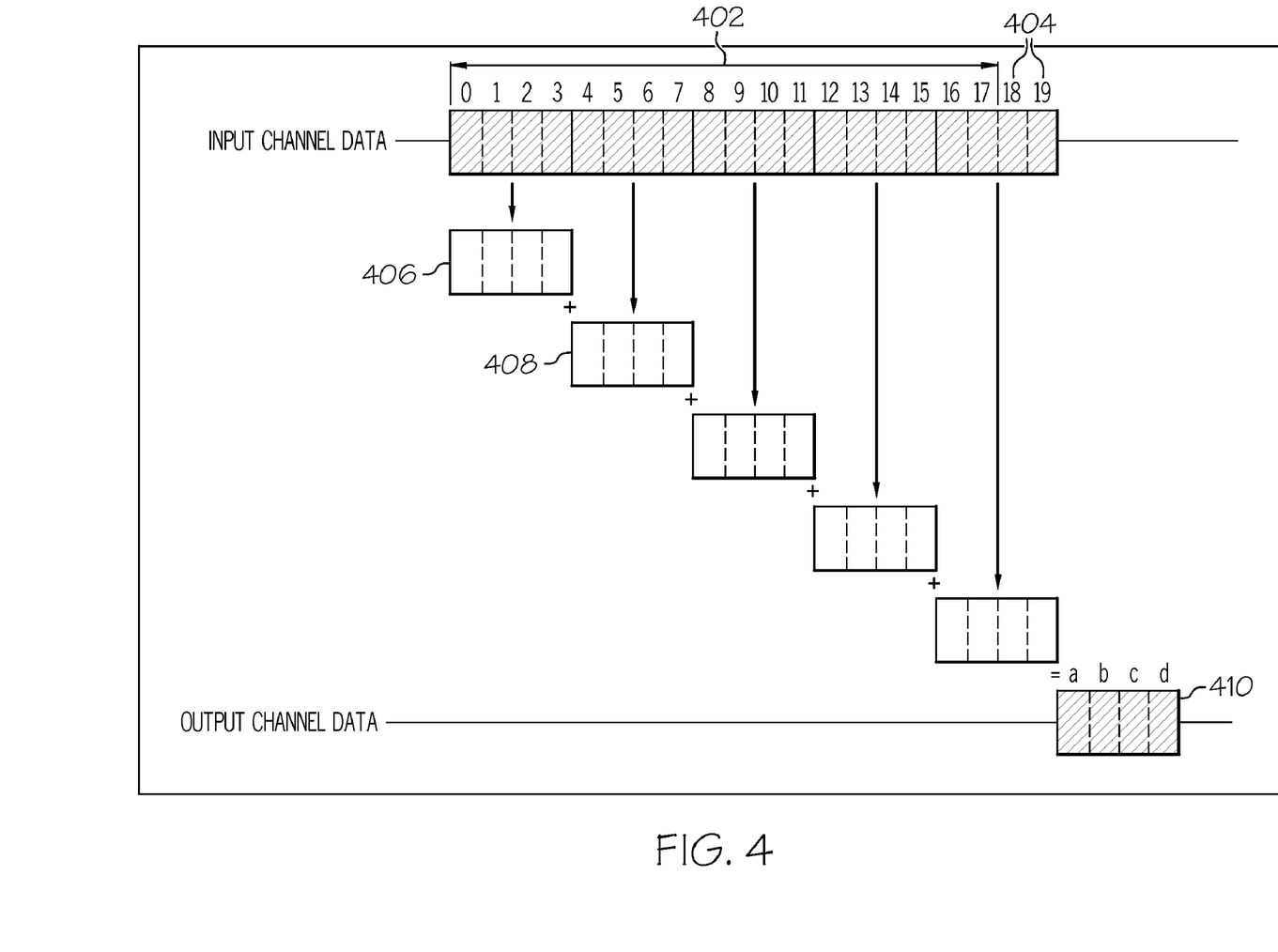
FIG. 4 is a timing diagram of one embodiment of a 4-point compression scheme for use in the system of FIG. 3.

FIG. 4 is a timing diagram for one embodiment of a 4-point compression scheme. The compression scheme compresses samples of data covering multiple periods of a waveform into one set of data the size of a single period. Since the compression scheme is a 4-point compression scheme, the compression scheme compresses data which has been sampled at 4 times, or a multiple thereof, of the frequency of the sampled signal. Thus, 4-point compression scheme compresses 5 or more samples of data into 4 data points. This reduces the processing required for anything downstream of the 4-point compression, because of the reduced amount of data. Additionally, the signal to noise ratio of the samples is increased which also makes for easier processing of the signal. In this embodiment, and as described above, the return pulse is sampled at four times the center frequency, thus, the data is compressed to four data points. In other embodiments, however, the compression scheme is modified to compress data that is sampled at 3, 5, or more times the frequency of the sampled signal. In these embodiments, the data is compressed into a number of data points equal to one period of the sampled waveform.

The 4-point compression scheme begins by padding the input samples if needed to make a set of samples which is a multiple of the digital sampling rate divided by the center frequency of the sampled signal. In this embodiment, the digital sampling rate is 100 Mhz and the center frequency of the sampled signal is 25 Mhz, therefore, the samples are formed in a set which is multiple of four (4). In this embodiment, the number to which the sample sets are made a multiple of is equal to the number of data points resulting from the compression scheme. Since the number of samples is dependent upon the width of the gate, which is dependent upon the return pulse width, the number of samples may be any integer number, and not necessarily a multiple of four. Thus, to pad the samples, extra data points with a value of zero are added to the end of the samples set. For example, if the sample set as sampled by the gate contains 18 data points 402, a single data point having a value of zero is added as data points 18 and 19 (404) to make 20 total data points.

To compress the digitally sampled data, the 4-point compression scheme sums the sampled data such that each sample is added to each later sample which represents a similar phase of the waveform. As shown in FIG. 4, the set of input data has 20 data points. To sum the data points, the first set of four samples is added to the second set of four samples. The sum of that is added to the third four samples, which is added to the fourth four samples, which is added to the fifth four samples to obtain the output of four data points. For example, if each data point of the input channel is labeled 0-19, the first addition of block 406 and 408 would add data point 0 to data point 4, data point 1 to data point 5, data point 2 to data point 6, and data point 3 to data point 7. Likewise continuing on the summation for each of the four output data points (a,b,c,d) at block 410 is a=0+4+8+12+16; b=1+5+9+13+17; c=2+6+10+14+18; and d=3+7+11+15+19. Because each input data point is represented in 12-bit twos compliment, each data point can be added and the sign of the number is automatically taken into account. The addition of five twos compliment numbers, however, may result in an overflow. If this occurs, extra bits are added to the 12-bit numbers to accommodate the overflow. Thus, no loss of data occurs.

Figure 5:
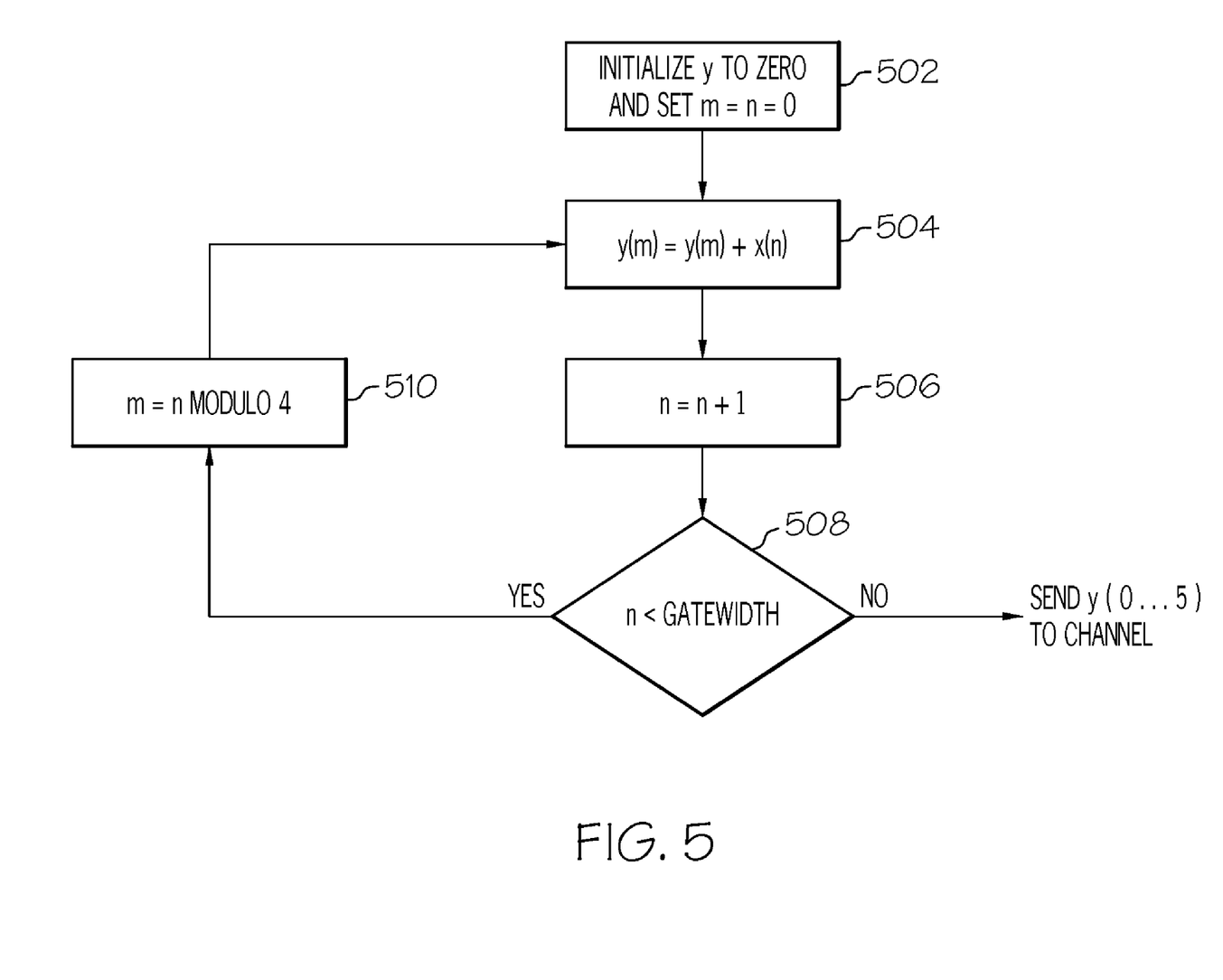
FIG. 5 is a flow chart of one embodiment of the 4-point compression scheme of FIG. 4.

FIG. 5 represents a mathematical flow chart of the 4-point compression scheme. In FIG. 5, x(n) refers to a set of input data points with the number of data points equal to 'gate-Width', which is the width of the gate in ticks. y(m) refers to the set of four output data points. Two variables 'm' and 'n' are incremented to count through each input data point and add each data point to the total in its corresponding output data point. At block 502 the output 'y' and variables 'm' and 'n' are initialized by setting them to zero. The summation process begins at block 504, where the data point n=0 of the input is stored in the data point m=0 of the output. Next at block 506 n is incremented by 1 to go to the next input data point. At decision block 508, the summation process continues if n is less than the gate width, which in this example is 20 data points. Continuing on with the summation to block 510, m is given the value of n modulos 4, which here increases m to 1. The summation process continues around the circle adding the input data points to the output data points until n has reached the gate width. The 4-point compression scheme is then completed and the resulting y(0, 1,2,3) is sent on to the 4-point rotation. It should be noted that in a case where there are only four input data points, 4-point compression is not necessary since the data is already at four points.

Figure 6:
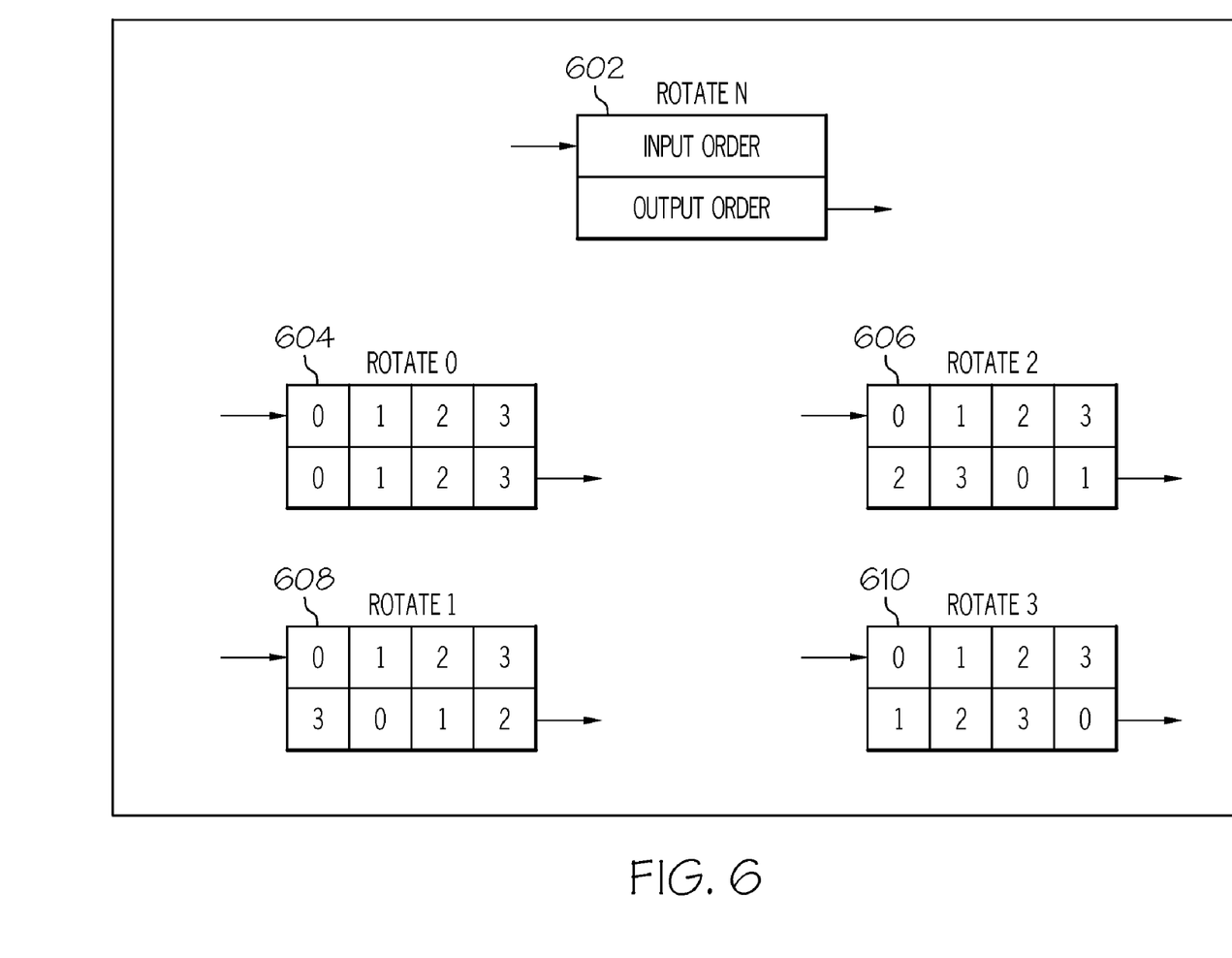
FIG. 6 is a sequence diagram of one embodiment of a 4-point rotation scheme for use in the system of FIG. 3.

FIG. 6 is a sequence diagram for one embodiment of a 4-point rotation scheme. The 4-point rotation scheme rotates the output points of the 4-point compression to maintain a proper phase between successive samples taken by radar system 104. The filter which processes the data obtained from the return pulse runs by correlating each new data with the previously received data. In order for the filter to correctly correlate new data with the previous data, the new data must be received in the same phase as the old data. If the data is received 90 or 180 degrees off in phase, the filter may rapidly decay. The 4-point rotation scheme adjusts for gate position tracking and avoids disruption associated with rotating the phase 90 degrees at the output of the system. For example, in one embodiment, a gate position during a first sample is 48 sample clock ticks from the start of the transmit pulse 4-point results in a rotate 0 which keeps the data points in the same order. When the gate position is changed such that the first sample obtained is 47 sample clock ticks from the transmit pulse, a rotate 3 results and when the gate position is equal to 49 clock ticks, a rotate 1 results. Each of these rotations aligns the phase of data points of sample sets between PRIs while allowing only the current data position to be known.

Thus, since as the gate position changes, the phase of the return pulse as received may also change. The 4-point rotation scheme, therefore, accounts for any change in phase from one sample to the next. The lower two gate position bits are used to determine how much if any rotation is needed in the input data. As shown in FIG. 6 there are four possible rotations. Block 602 illustrates the relationship between the input data points of the 4-point rotation and the output data points. Block 604 shows the rotate zero point, i.e. no rotation between input and output. Blocks 606, 608, and 610 show rotation of 1, 2, or 3 samples respectively. Both the input and output of the 4-point rotation scheme is N-bit twos compliment data.

Figure 7:
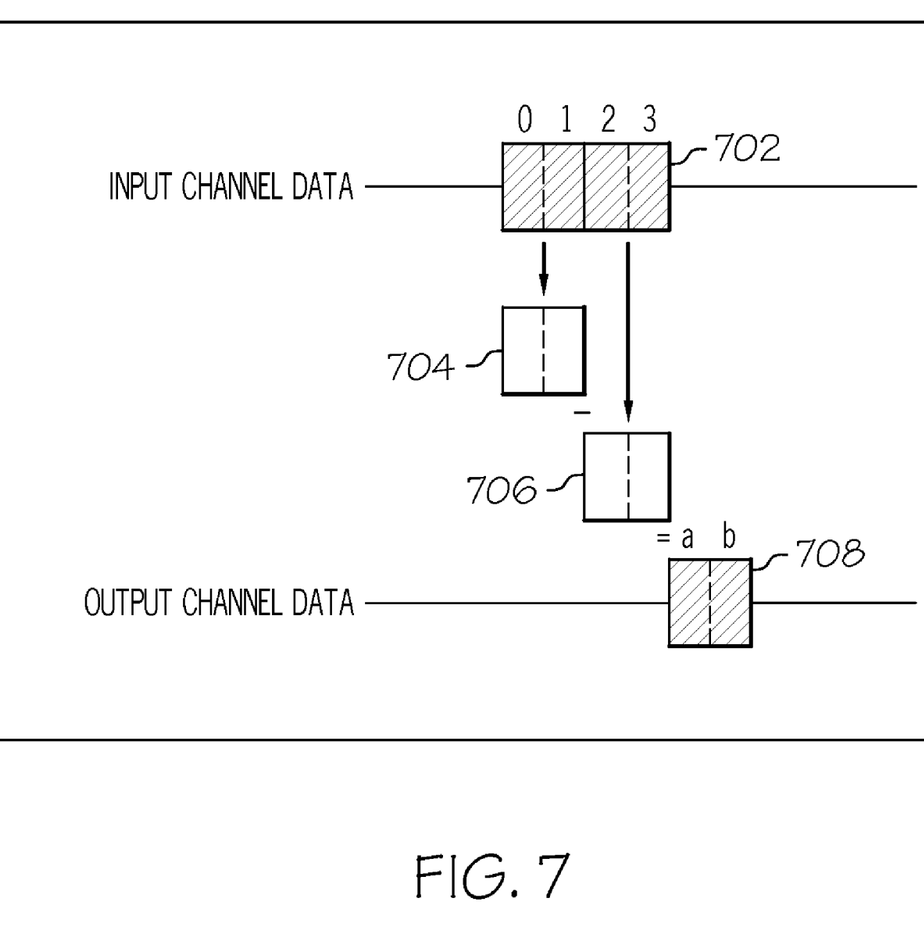
FIG. 7 is a timing diagram of one embodiment of a 2-point compression scheme for use in the system of FIG. 3.

From the 4-point rotation scheme, the four data points are sent to 2-point compression scheme, as illustrated in FIG. 7, where the four points are further compressed into two points. In this embodiment, the four data points correspond to one period of the waveform which was input into the system of FIG. 3. In one instance, the four data points are an intact sampling of one period of the waveform, thus no 4-point compression is required. In another instance, the four data points are the result of 4-point compression on a number of samples spanning more than one period. The samples spanning more than one period are compressed by the 4-point compression scheme as described above into four data points which correspond to one period of the input waveform and are approximately 90 degrees apart from one another.

The two point compression scheme further compresses the 4-points down into two points. To begin, the four points are split into two halves and one half is subtracted from the other half. For example, as shown in FIG. 7, the input to the 2-point compression has four points represented as 0, 1, 2, and 3 at block 702. The first two points (0,1), block 704, representing the first half of the waveform are subtracted from the second two points (2,3), block 706, which represent the second half of the waveform. In one embodiment, the subtraction includes reversing the signs of the second two data points (2,3) and summing the sign-reversed data points with the first two data points (0,1). Mathematically if the two output data points, block 708, are represented by a and b, then a=0−2 and b=1−3 in relation to the input data points. In this way each data point is subtracted from another point on the waveform which is similar in amplitude, but opposite in phase. Since the data points being subtracted are 180 degrees apart in phase, the subtraction negates the opposite sign of the second two data points so the data can be properly added. The result of the 2-point compression is two data points representative of the entire return pulse which are 90 degrees apart in phase, i.e., an in-phase data point and quadrature phase data point. These two points are sent to the band pass filter for further signal processing.

Figure 8:
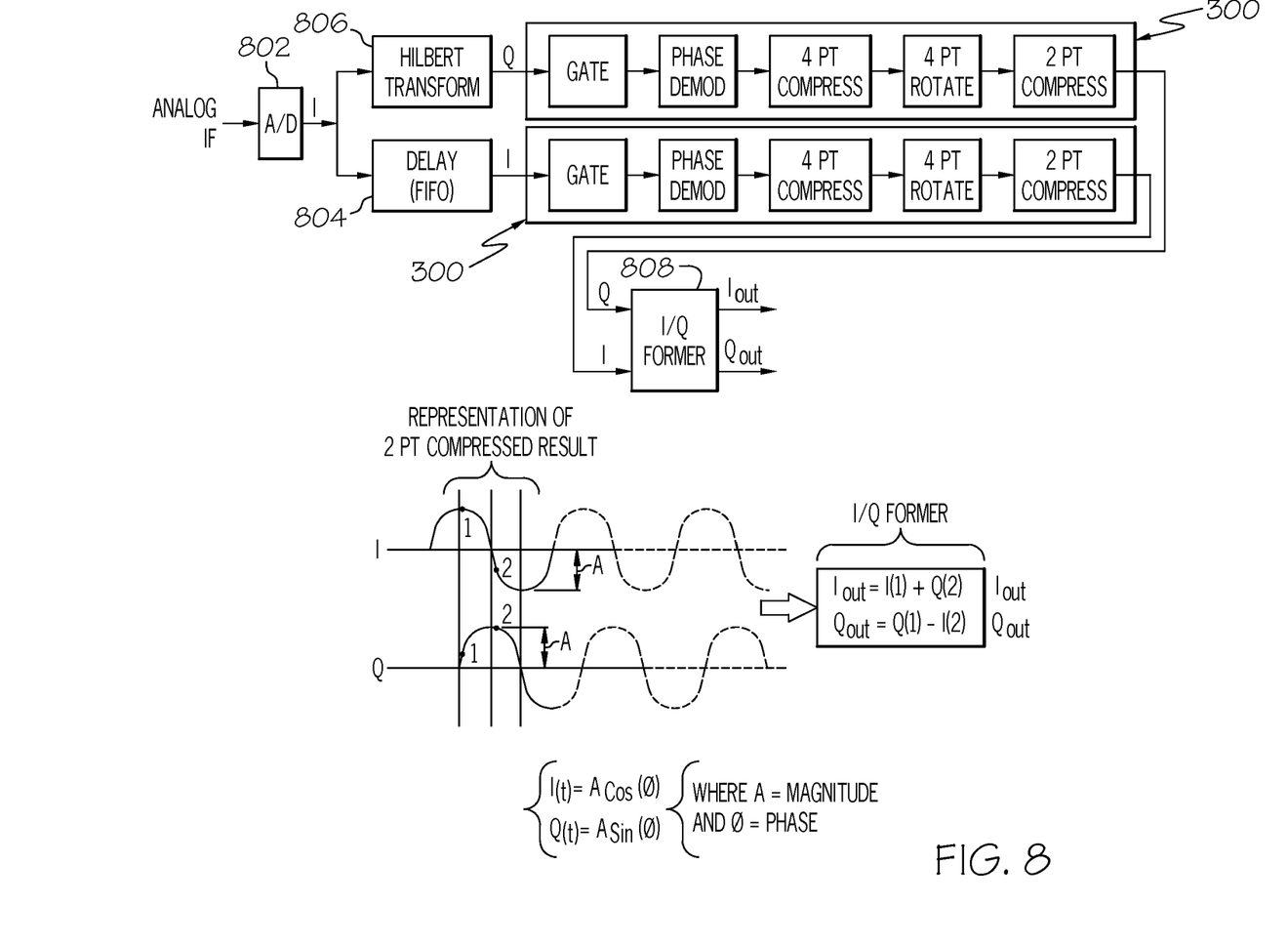
FIG. 8 is a functional block diagram of an alternative embodiment of a system for processing return pulses from a radar.

In one embodiment, shown in FIG. 8, a Hilbert Transform 806 is used to increase the accuracy of the signal processing. The analog IF signal is first converted to a digital signal with analog to digital converter (ADC) 802. The signal is then split sent to a delay circuit 804 and a Hilbert Transform circuit 806. In this embodiment, delay circuit 804 is a first in first out (FIFO) delay circuit which delays the signal while the adjacent Hilbert Transform 806 is processing. The signal sent through delay circuit 804 is the I signal component, represented at $I(t)=A\cos(\emptyset)$. Hilbert Transform 806 calculates a Q signal, represented as $Q(t)=A\sin(\emptyset)$, from the I signal received. Both the I and the Q signals are then sent through separate signal processing of system 400 as described with reference to FIG. 3. Two sets of I and Q components are obtained from these calculations, one set from the I signal and the other set of components from the Q signal. These two I and Q components are then combined in an I/Q former 808 to obtain a final I and Q representing the return pulse. As shown in FIG. 8, the two points from each I and Q are represented as I(1), I(2) and Q(1), Q(2). The final I is equal to I(1)+Q(2) and the final Q is equal to Q(1)−I(2). These final I and Q data point are then sent to the band pass filter for further processing.

In one embodiment, 2-point compression is applied when I and Q signals are received as separate analog signals. Here, each signal is sampled at a rate double the center frequency of the signal. This is described by the equation $(Fs/2)*n$ for n greater than of equal to 0. For odd n, every other sample has its sign inverted and the sample is then summed with the previous sample. For even n, every sample is summed with the previous sample of the gate. Thus, 2-point compression is achieved when having separate I and Q analog inputs.

In some embodiments, a computer readable medium contains instructions which when executed by a processor implement the functional blocks of FIG. 3. A computer readable medium includes a hard drive, memory device, compact-disc (CD), digital video disc (DVD), tape based storage devices, such as a zip drive, and other similar data storage devices. The computer readable medium contains instructions, such as program code, which can be read by a processor and executed by the processor and associated components to implement the functional blocks of FIG. 3.

Although as described the embodiments of FIGS. 1-8 processes digital samples from a return pulse, data processed from other signal types can also be used. For example, in other embodiments, a continuous waveform is digitally sampled and split into sections. Each section is then subjected to the functional blocks as described in FIG. 3.

Furthermore, although the embodiments of FIGS. 1-8 are described as processing data which has been sampled at four times the center frequency of the signal, other sampling rates could also be used and the mathematical relationships of each step are adjusted accordingly. For example, in other embodiments, the data is sampled at 12 times the center frequency of the sample. Here, a 12-point compression scheme and 12-point rotation scheme are used instead of the 4-point compression scheme and 4-point rotate respectively. The 12-point compression scheme compresses more than 12 samples of data into 12 samples of data corresponding to one period of the sampled waveform. Also, a 6-point compression replaces the 2-point compression, where 12 data points corresponding to one period of the sampled waveform are compressed to 6 data points. To accomplish this 6-point compression, the data points representing a first half of the period of the waveform are subtracted from the data points representing a second half of the period of the waveform, in a manner similar to the 2-point compression scheme described above.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

What is claimed is:

1. A method of obtaining in-phase and quadrature phase components for a narrowband signal, the method comprising:
digitally sampling a narrowband signal at a digital sampling rate to obtain a number of data points; and
subtracting a first portion of the data points corresponding to a first half of one period of the signal from a second portion of the data points corresponding to a second half of the one period of the signal to obtain a number of output data points which is less than the number of data points obtained from sampling the narrowband signal.

2. The method of claim 1, wherein the digital sampling rate is four times a center frequency of the narrowband signal.

3. The method of claim 1, wherein digital sampling further comprises:
obtaining a number of digital samples spanning more than one period of the signal; and
compressing the digital samples into a number of data points corresponding to one period of the signal.

4. The method of claim 3, further comprising:
if the number of digital samples is not a multiple of the digital sampling rate, divided by a center frequency of the signal, adding blank data points to an end of the digital samples until the number of digital samples is a multiple of the digital sampling rate divided by a center frequency of the signal.

5. The method of claim 4, wherein compressing the digital samples further comprises:
summing together each digital sample that is separated by a number equal to the digital sampling rate divided by a center frequency of signal to form the plurality of data points.

6. The method of claim 1, further comprising:
rotating the plurality of data points to align a phase of the data points with a phase of data points from a previous digital sample.

7. The method of claim 1, wherein the narrowband signal is a return pulse of a radar system.

8. The method of claim 7, wherein digitally sampling further comprises gating the digital sampling of the narrowband signal to reduce processing of samples while the return pulse is not being received.

9. A method of obtaining in-phase and quadrature phase components for a narrowband signal, the method comprising:
digitally sampling a narrowband signal at four times the center frequency of the signal to obtain a first, second, third, and fourth data points corresponding to one period of the signal, wherein the first, second, third, and fourth data points are sequential;
subtracting the third data point from the first data point to obtain an in-phase component of the signal; and
subtracting the fourth data point from the second data point to obtain a quadrature phase component of the signal.

10. The method of claim 9, wherein digital sampling further comprises:
obtaining a number of digital samples which is greater than four; and
compressing the digital samples into the first, second, third, and fourth data points corresponding to one period of the signal.

11. The method of claim 10, further comprising:
if the number of digital samples is not a multiple of four, adding blank data points to an end of the number of digital samples until the number of digital samples is a multiple of four.

12. The method of claim 10, wherein compressing the digital samples further comprises:
dividing the digital samples into a plurality of groups, each group having four consecutive samples, wherein the four consecutive samples in sequential order are a first, second, third, and fourth sample;
adding each of the first samples of each of the groups to obtain the first data point;
adding each of the second samples of each of the groups to obtain the second data point;
adding each of the third samples of each of the groups to obtain the third data point; and
adding each of the fourth samples of each of the groups to obtain the fourth data point.

13. The method of claim 9, further comprising:
rotating the first, second, third, and fourth data points to align a phase of the data points with a phase of data points from a previous digital sample.

14. The method of claim 9, wherein the narrowband signal is a return pulse of a radar system.

15. The method of claim 14, wherein digitally sampling further comprises gating the digital sampling of the narrowband signal to reduce processing of samples while noise is being received.

16. A system for obtaining in-phase and quadrature phase components for a narrowband signal, the apparatus comprising:
a radar system for determining a location of a vehicle, the radar system having a radar configured to transmit a pulse and configured to digitally sample a return signal from the transmitted pulse, wherein the return signal is sampled at four times the center frequency of the signal to obtain a first, second, third, and fourth data points corresponding to one period of the signal, the radar system further configured to reverse the signs of the third and the fourth data points;
wherein the radar system is configured to sum the first data point with the sign-reversed third data point to obtain an in-phase component of the signal, and to sum the second data point with the sign-reversed fourth data point to obtain a quadrature phase component of the signal.

17. The system of claim 16, wherein the radar system is further configured to compress more than four digital samples obtained into the first, second, third, and fourth data points corresponding to one period of the signal.

18. The system of claim 17, wherein the radar system is further configured to add blank data points to an end of the number of digital samples until the number of digital samples is a multiple of four.

19. The system of claim 17, wherein the radar system is further configured to divide the digital samples into a plurality of groups, each group having four consecutive samples, wherein the four consecutive samples in sequential order are a first, second, third, and fourth sample; and wherein the radar system is configured to add each of the first samples of each of the groups to obtain the first data point, add each of the second samples of each of the groups to obtain the second data point, add each of the third samples of each of the groups to obtain the third data point, and add each of the fourth samples of each of the groups to obtain the fourth data point.

20. The system of claim 16, wherein the radar system is further configured to rotate the first, second, third, and fourth data points to align a phase of the data points with a phase of data points from a previous digital sample.

* * * * *